US011000172B2

(12) United States Patent
Duguay

(10) Patent No.: US 11,000,172 B2
(45) Date of Patent: May 11, 2021

(54) ADJUSTABLE GRILL GRATE SCRAPER

(71) Applicant: Irma Marie Duguay, North Gower (CA)

(72) Inventor: Irma Marie Duguay, North Gower (CA)

( * ) Notice: Subject to any disclaimer, the term of this patent is extended or adjusted under 35 U.S.C. 154(b) by 1 day.

(21) Appl. No.: 16/527,246

(22) Filed: Jul. 31, 2019

(65) Prior Publication Data

US 2020/0037844 A1 Feb. 6, 2020

Related U.S. Application Data

(60) Provisional application No. 62/712,940, filed on Jul. 31, 2018.

(51) Int. Cl.
*A47L 13/08* (2006.01)
*A47L 17/06* (2006.01)

(52) U.S. Cl.
CPC ............... *A47L 13/08* (2013.01); *A47L 17/06* (2013.01)

(58) Field of Classification Search
CPC ...... A47J 37/0786; A47L 13/08; A47L 13/34; A47L 17/06
See application file for complete search history.

(56) References Cited

U.S. PATENT DOCUMENTS

| | | | | |
|---|---|---|---|---|
| 241,241 A * | 5/1881 | Ruge | ...................... | G01B 5/207 33/561.1 |
| 362,724 A * | 5/1887 | Davernport | ............ | G01B 5/207 33/561.1 |
| 470,794 A * | 3/1892 | Shempp | ................. | B24D 15/04 451/495 |
| 1,062,214 A * | 5/1913 | Bergman | ............... | B24D 15/04 451/495 |
| 1,165,452 A * | 12/1915 | Rudolph | ................ | B24D 15/04 451/495 |
| 1,570,177 A * | 1/1926 | Pointer | ................... | B24D 15/00 451/495 |
| 2,022,628 A * | 11/1935 | Whitney | ................ | G01B 5/207 33/561.1 |
| 2,759,271 A * | 8/1956 | Von Duyke | ......... | A61B 5/1077 33/561.1 |
| 2,824,323 A * | 2/1958 | Oreste | ..................... | A47J 37/06 15/105 |
| 2,949,674 A * | 8/1960 | Wexler | ..................... | G01B 5/20 33/561.1 |

(Continued)

*Primary Examiner* — Marc Carlson

(57) ABSTRACT

A grill grate scraper comprises a handle portion adapted to be grasped by a user and a scraper assembly opposite the handle portion. The scraper assembly includes a scraper head made up of a plurality of scraper blades and a locking mechanism. The locking mechanism can be in an unlocked position where the plurality of scraper blades are moveable relative to one another and a locked position where the plurality of scraper blades are locked in place. Each of the plurality of scraper blades can be a rigid blade comprising a scraping portion and a rearward portion, the scraping portion comprising a scraping edge and an adjacent side surface. In one version, when in the locked position, the locking mechanism applies a lateral compressive force on the plurality of scraper blades. In another version, the locking mechanism prevents accidental separation of the scraper blades from the scraper assembly when in the unlocked position.

20 Claims, 10 Drawing Sheets

(56) References Cited

U.S. PATENT DOCUMENTS

| | | | | |
|---|---|---|---|---|
| 3,678,587 | A * | 7/1972 | Madden | G01B 5/28 |
| | | | | 33/561.1 |
| 4,715,124 | A * | 12/1987 | Harrington | G01B 5/207 |
| | | | | 33/561.1 |
| 5,140,784 | A * | 8/1992 | Walsh | B24D 15/00 |
| | | | | 451/495 |
| 5,255,406 | A * | 10/1993 | Rood | A47J 37/0786 |
| | | | | 15/236.06 |
| 5,720,071 | A * | 2/1998 | Hall | A47J 37/0786 |
| | | | | 15/142 |
| 6,283,842 | B1 * | 9/2001 | Collins | B24B 23/04 |
| | | | | 451/495 |
| 7,086,117 | B2 * | 8/2006 | Lann | A47J 37/0786 |
| | | | | 15/236.06 |
| 8,968,057 | B1 * | 3/2015 | Mor | B24D 15/02 |
| | | | | 451/495 |
| 9,403,261 | B2 * | 8/2016 | Weinberger | A47J 43/288 |
| 9,778,012 | B1 * | 10/2017 | Fales | G01B 5/08 |
| 10,328,466 | B2 * | 6/2019 | Winter | A47J 37/0786 |
| 2005/0086754 | A1 | 4/2005 | Dalias | |
| 2005/0160544 | A1 | 7/2005 | Geller | |
| 2006/0207042 | A1 | 9/2006 | Di Paola | |
| 2017/0340188 | A1 * | 11/2017 | Rylands | A46D 1/0207 |
| 2018/0161822 | A1 * | 6/2018 | Winter | A47J 37/0786 |
| 2020/0037844 | A1 * | 2/2020 | Duguay | A47J 37/0786 |

* cited by examiner

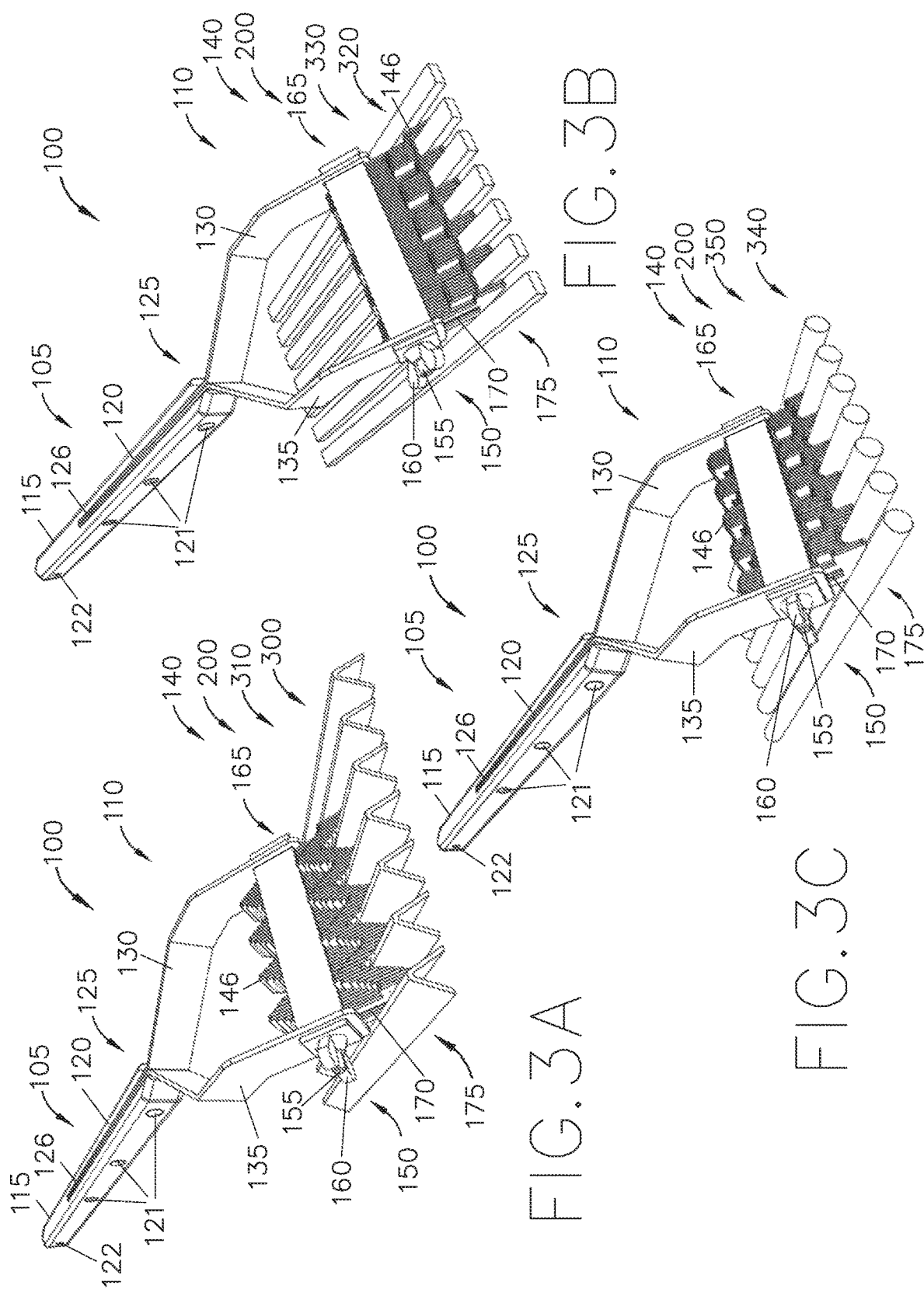

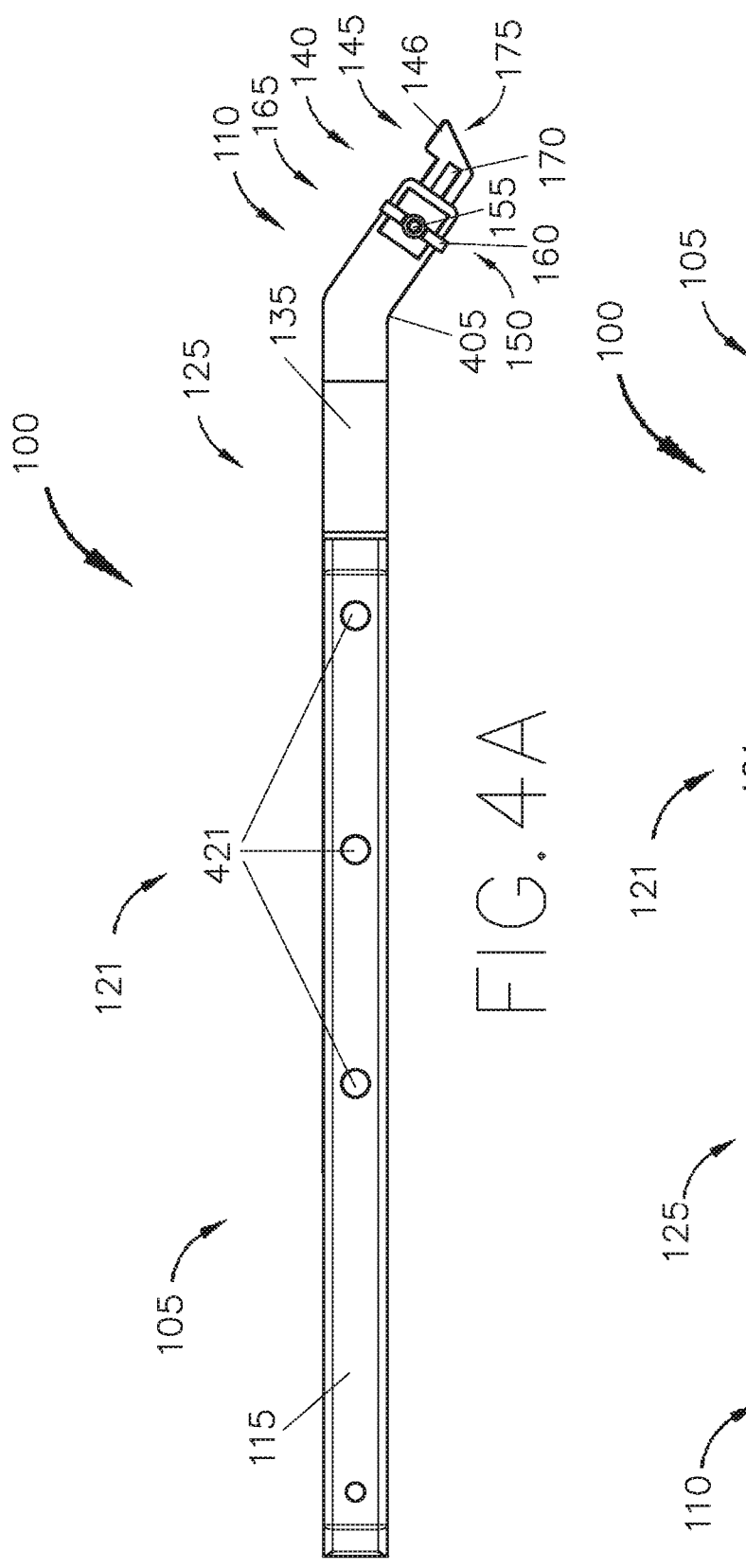
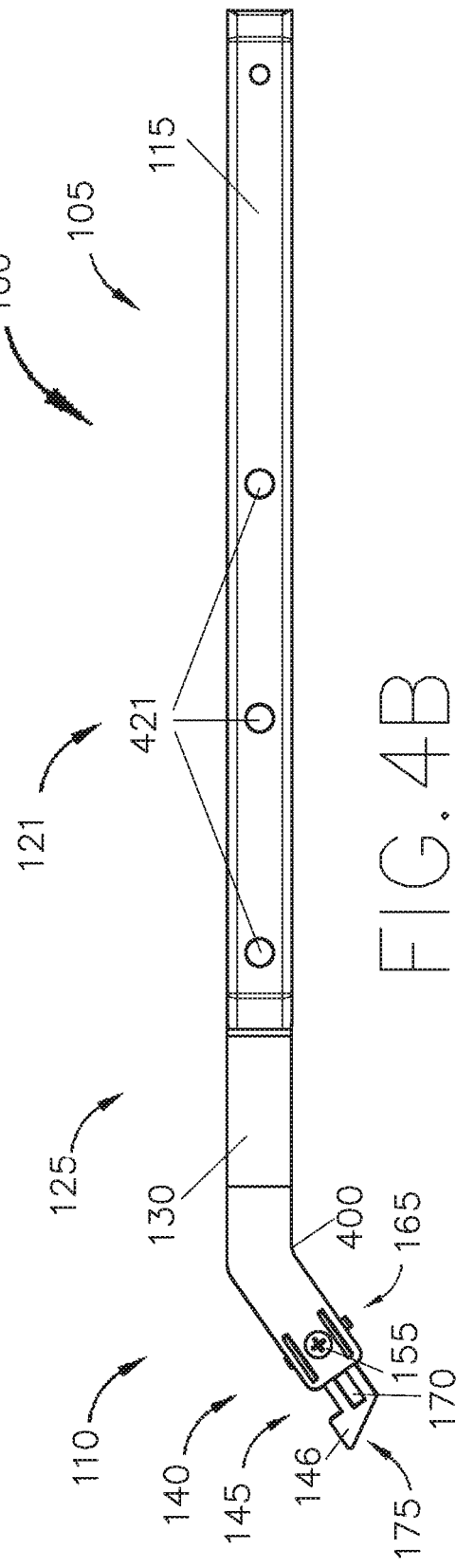
FIG. 4A
FIG. 4B

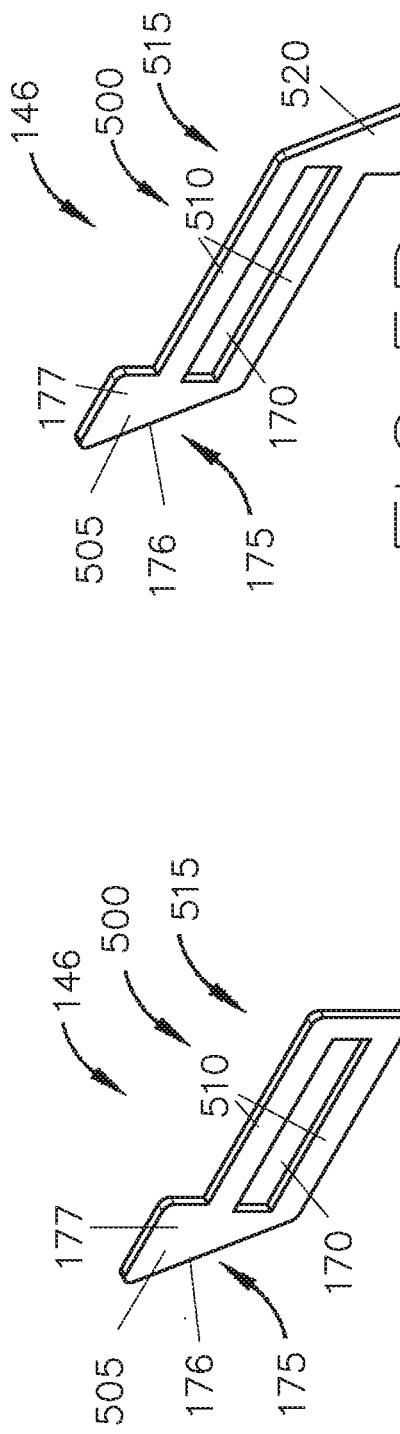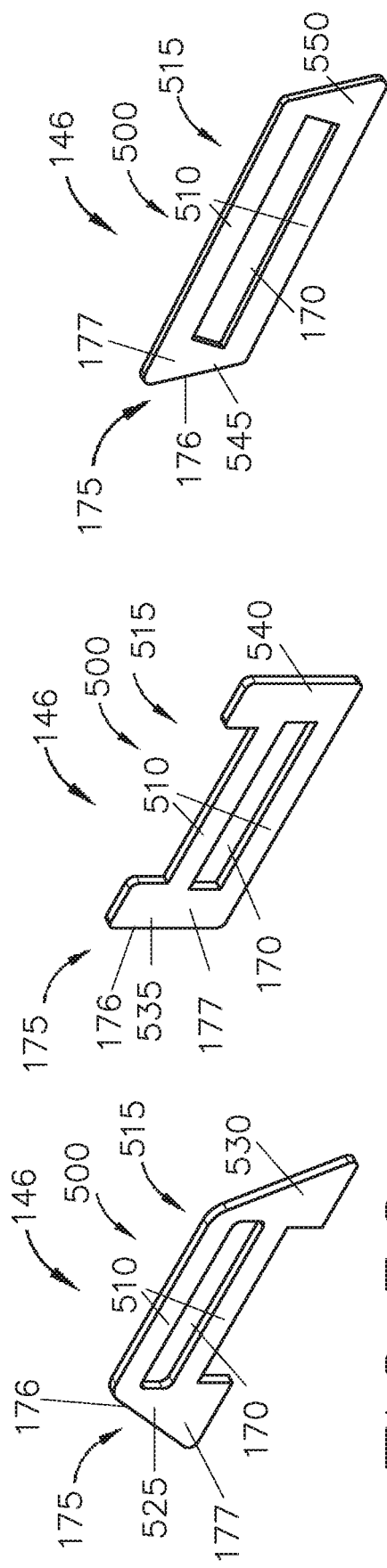

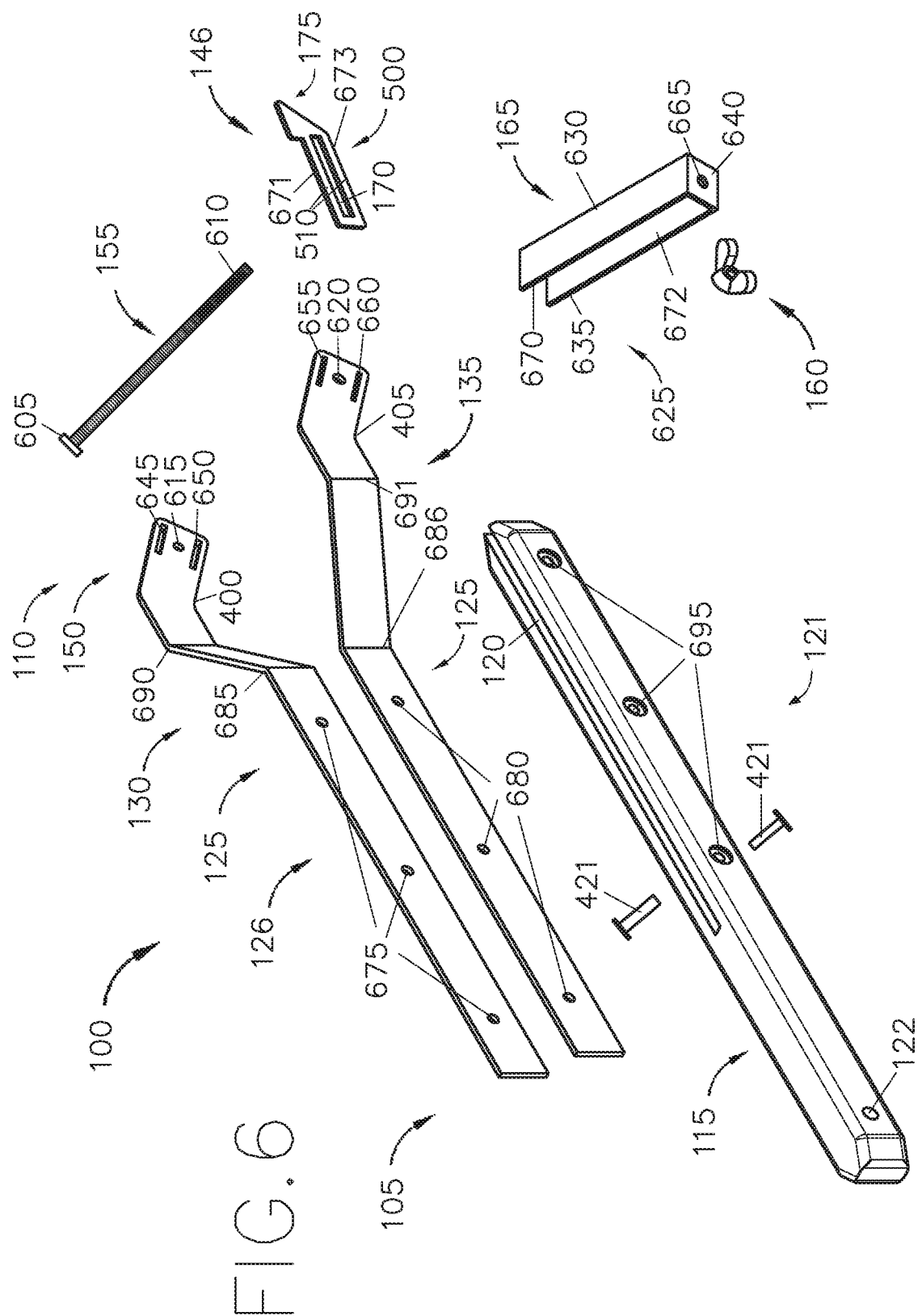

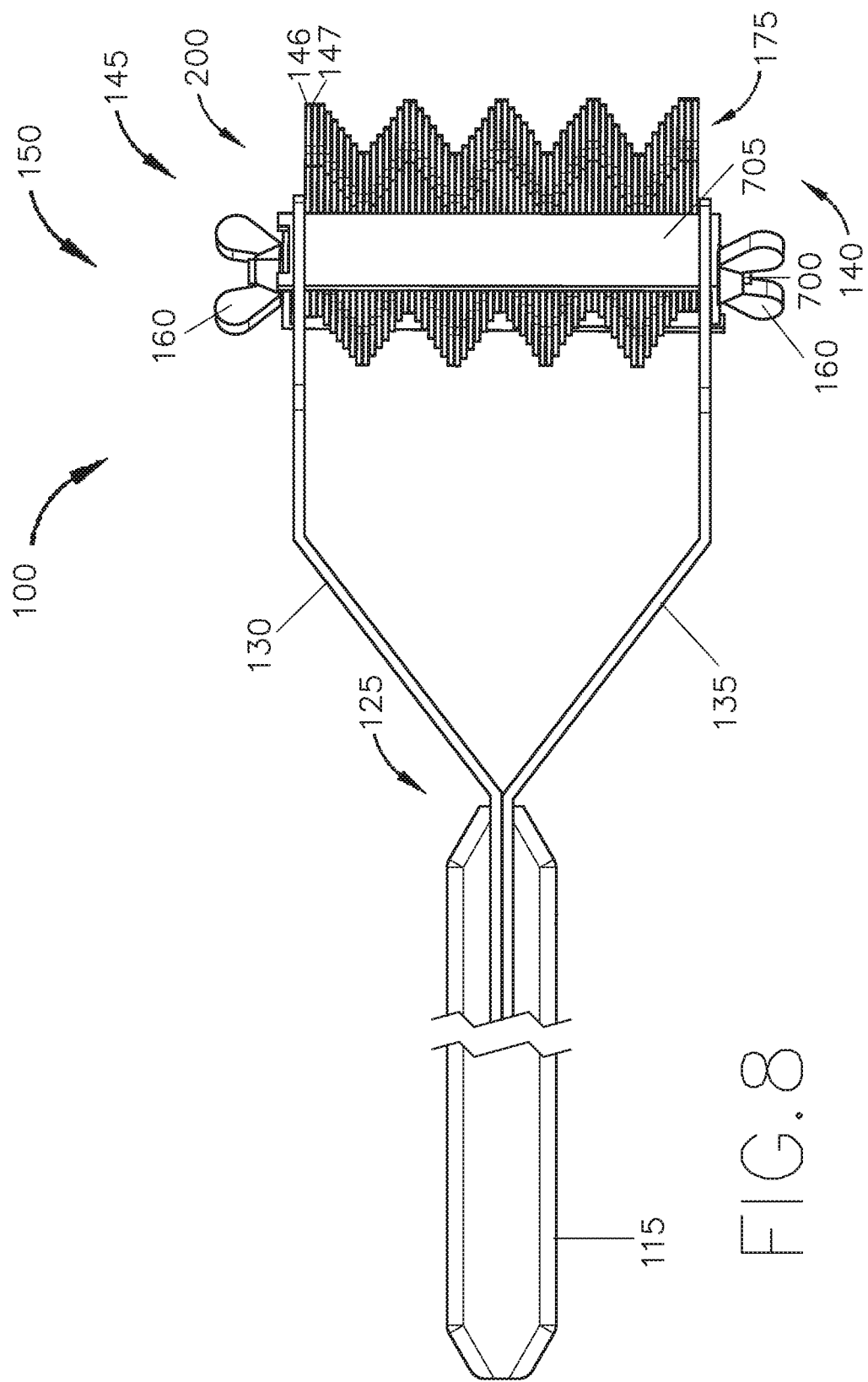

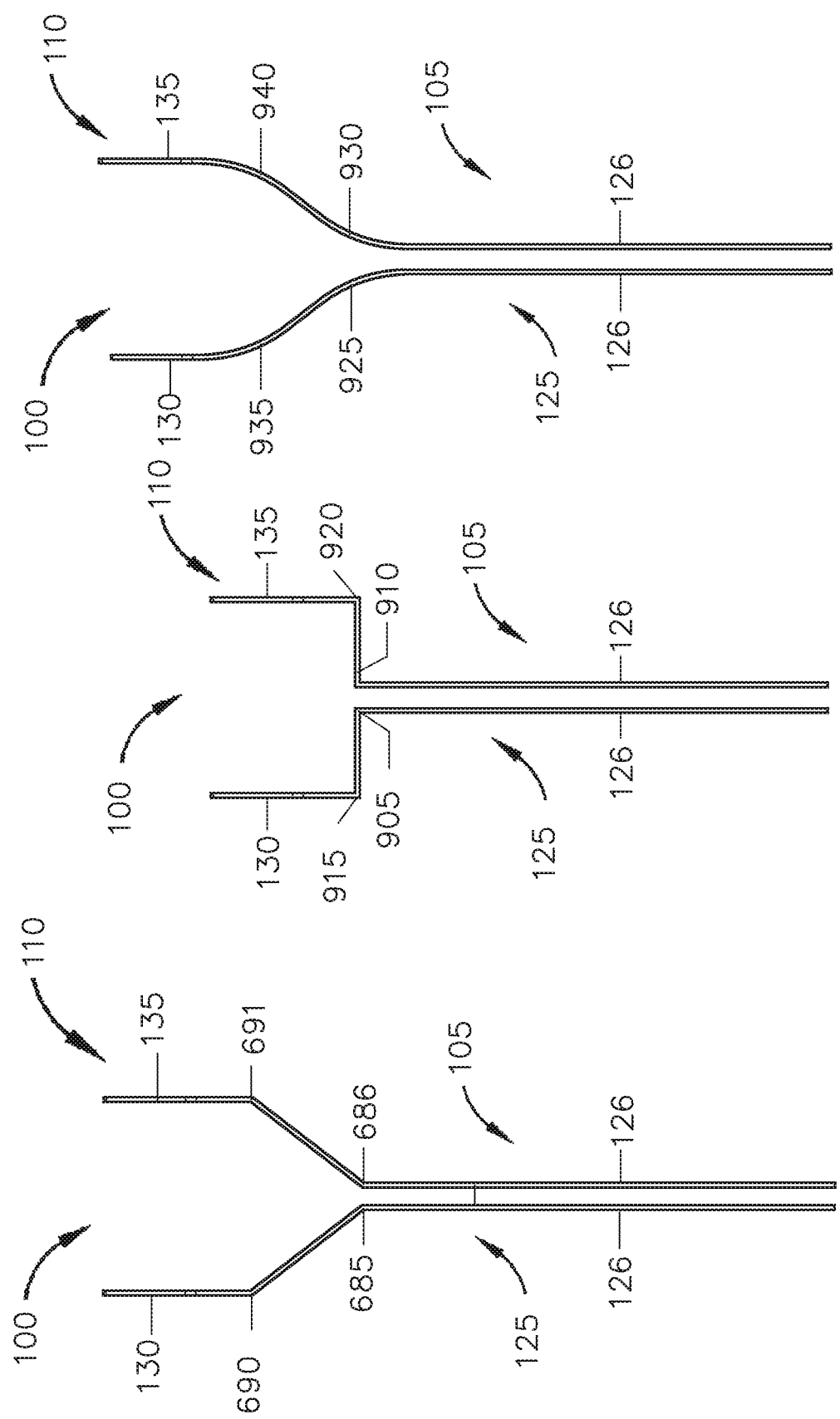

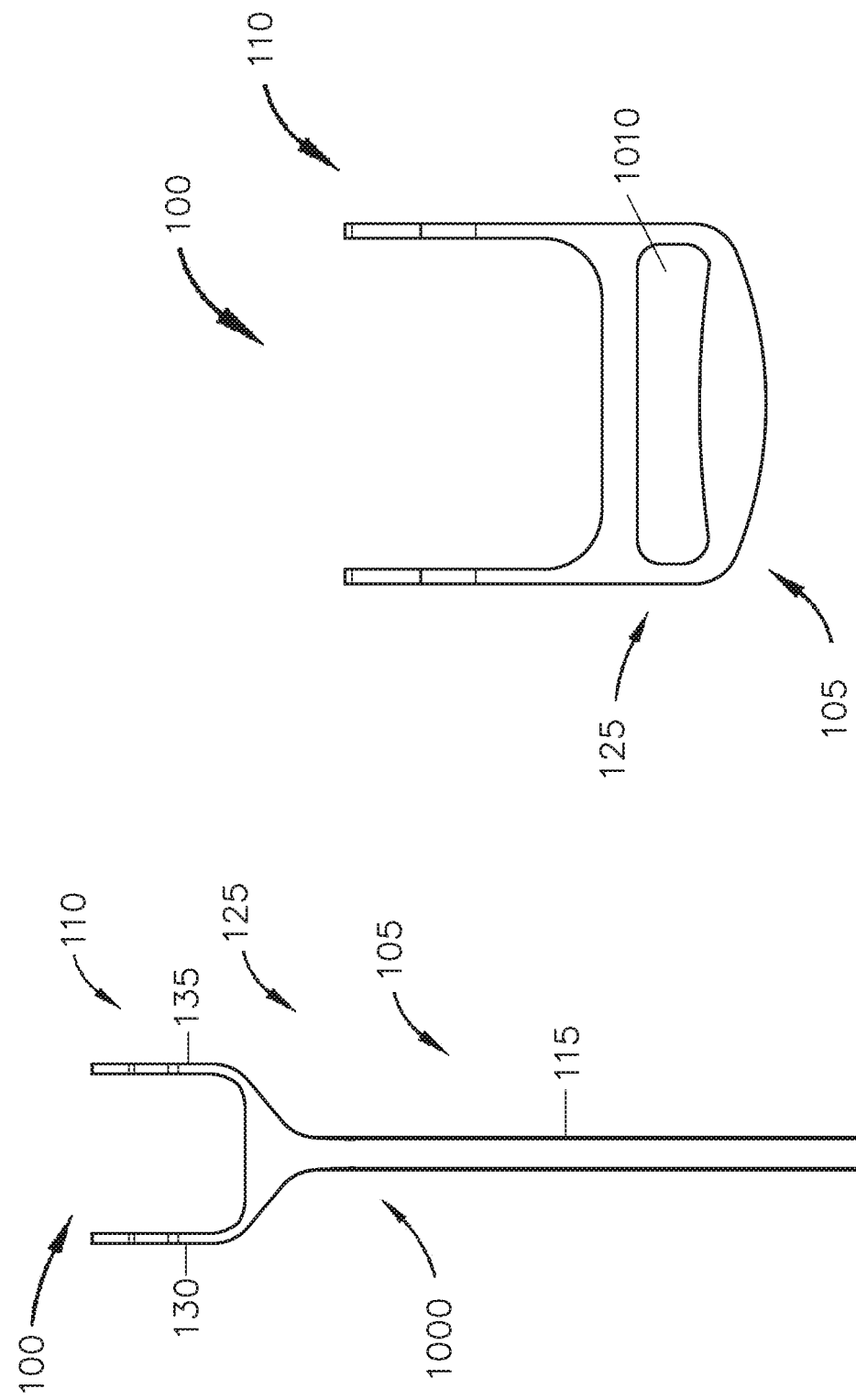

ADJUSTABLE GRILL GRATE SCRAPER

PRIORITY

The present application claims the benefit of domestic priority based on U.S. Provisional Patent Application 62/712,940 filed on Jul. 31, 2018, the entirety of which is incorporated herein by reference.

BACKGROUND

Barbecue grilling continues to become an increasingly popular outdoor activity. Barbecue grilling is a relaxing and entertaining social activity that often brings family and friends together for enjoyable gatherings. The barbecue grill also offers a method of cooking food utilizing different techniques such as smoking, roasting, braising and grilling, that result in unique flavors and textures which cannot be easily duplicated in a traditional kitchen.

However, barbecue grilling is not without its disadvantages and inconveniences. During the grilling process, food particles, charred debris, food residue and grease tend to accumulate on grill grates. Unsanitary barbecue grill grates can house material containing disease-causing bacteria, viruses, and sometimes carcinogens. Therefore, frequent cleaning to remove the deposits and residues is necessary to maintain a clean cooking surface. In addition, regular maintenance will benefit the integrity and life span of the grill grates.

Convenient, safe and effective grill grate cleaning has proven to be hard to achieve. Consumers will often use commonly available wire brushes for the purpose. However, wire brushes suffer from several disadvantages. For example, the bristles of a wire brush tend to bend after a few uses. The bent bristles become less stiff and less effective as cleaning instruments. In some cases, the bristles can break off and remain in the grill or on the grill grate. These bristles can be a hazard if they become lodged into food being prepared.

As an alternative to the wire brush, grill grate scrapers having a more rigid scraping blade have been developed. However, these too have proven to be less than ideal. One problem with conventional scrapers is the lack of universality. A grill grate, which is typically made of an assembly of parallel metal rails welded to one or more common metal bars perpendicular to the parallel rails, are provided in a variety of different grill grate profiles and spacing configurations. For example, some grill grates have rails having an angular, circular, or rectangular profile. There is often little uniformity among various brands and models of barbecue grill grates. It is not uncommon to find the distances and grill grate profiles between one model to be quite different from that in others. As a result, a scraper with a particular design for one type of grill grate may not be as effective in cleaning a grill grate of a different type.

Therefore, there is a need for an improved grill grate scraper. There is a further need for an effective universal grill grate scraper. There is a further need for a grill grate scraper that is strong and effective at cleaning grill grates of varying type. There is further a need for a grill grate scraper that is easily adjustable and securely lockable. There is further a need for a universal grill grate scraper that safely retains its components within the device.

SUMMARY

The present invention satisfies these needs. In one aspect of the invention, an improved grill grate scraper is provided.

In another aspect of the invention, a grill grate scraper is provided that is adjustable so that it may be universally utilized with different grill grate types and is strong and effective in doing so.

In another aspect of the invention, a grill grate scraper is provided that is easily and securely adjustable and lockable.

In another aspect of the invention, a grill grate scraper is provided that is safe to use and that retains its components within the device.

In another aspect of the invention, a grill grate scraper comprises a handle portion adapted to be grasped by a user, and a scraper assembly opposite the handle portion, the scraper assembly comprising a scraper head comprising a plurality of scraper blades and a locking mechanism, wherein the locking mechanism can be in an unlocked position where the plurality of scraper blades are moveable relative to one another and a locked position where the plurality of scraper blades are locked in place, wherein each of the plurality of scraper blades is a rigid blade comprising a scraping portion and a rearward portion, the scraping portion comprising a scraping edge and an adjacent side surface.

In another aspect of the invention, a grill grate scraper comprises a handle portion adapted to be grasped by a user, and a scraper assembly opposite the handle portion, the scraper assembly comprising a scraper head comprising a plurality of scraper blades and a locking mechanism, wherein the locking mechanism can be in an unlocked position where the plurality of scraper blades are moveable relative to one another and a locked position where the plurality of scraper blades are locked in place, wherein when in the locked position, the locking mechanism applies a lateral compressive force on the plurality of scraper blades.

In another aspect of the invention, a grill grate scraper comprises a handle portion adapted to be grasped by a user, and a scraper assembly opposite the handle portion, the scraper assembly comprising a scraper head comprising a plurality of scraper blades and a locking mechanism, wherein the locking mechanism can be in an unlocked position where the plurality of scraper blades are moveable relative to one another and a locked position where the plurality of scraper blades are locked in place, wherein the locking mechanism prevents accidental separation of the scraper blades from the scraper assembly when in the unlocked position.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

FIG. 3A is a schematic perspective view of the grill grate scraper of FIG. 1 configured to conform to a type of grill grate;

FIG. 3B is a schematic perspective view of the grill grate scraper of FIG. 1 configured to conform to a different type of grill grate;

FIG. 3C is a schematic perspective view of the grill grate scraper of FIG. 1 configured to conform to a different type of grill grate;

FIG. 4A is a schematic side view of the grill grate scraper of FIG. 1;

FIG. 4B is a schematic side view of the grill grate scraper of FIG. 4A from the opposite side;

FIG. 5A is a schematic perspective view of a version of a scraper blade for use in the grill grate scraper of the invention;

FIG. 5B is a schematic perspective view of another version of a scraper blade for use in the grill grate scraper of the invention;

FIG. 5C is a schematic perspective view of another version of a scraper blade for use in the grill grate scraper of the invention;

FIG. 5D is a schematic perspective view of another version of a scraper blade for use in the grill grate scraper of the invention;

FIG. 5E is a schematic perspective view of another version of a scraper blade for use in the grill grate scraper of the invention;

FIG. 6 is a schematic exploded view of the grill grate scraper of FIG. 1;

FIG. 8 is a schematic top view of the grill grate scraper of FIG. 7;

FIG. 9A is a schematic top view of a version of a handle connecting portion of a grill grate scraper of the invention;

FIG. 9B is a schematic top view of another version of a handle connecting portion of a grill grate scraper of the invention;

FIG. 9C is a schematic top view of another version of a handle connecting portion of a grill grate scraper of the invention;

FIG. 10A is a schematic top view of another version of a grill grate scraper of the invention; and FIG. 10B is a schematic top view of another version of a grill grate scraper of the invention.

DESCRIPTION

The present invention relates to an adjustable grill grate scraper. In particular, the invention relates to an adjustable grill grate scraper that is adjustable to accommodate multiple types of grill grates. Although the invention is illustrated and described in the context of being useful for cleaning barbecue grill grates, the present invention can be used in other ways, as would be readily apparent to those of ordinary skill in the art. Accordingly, the present invention should not be limited just to the examples and embodiments described herein.

Figure 1:
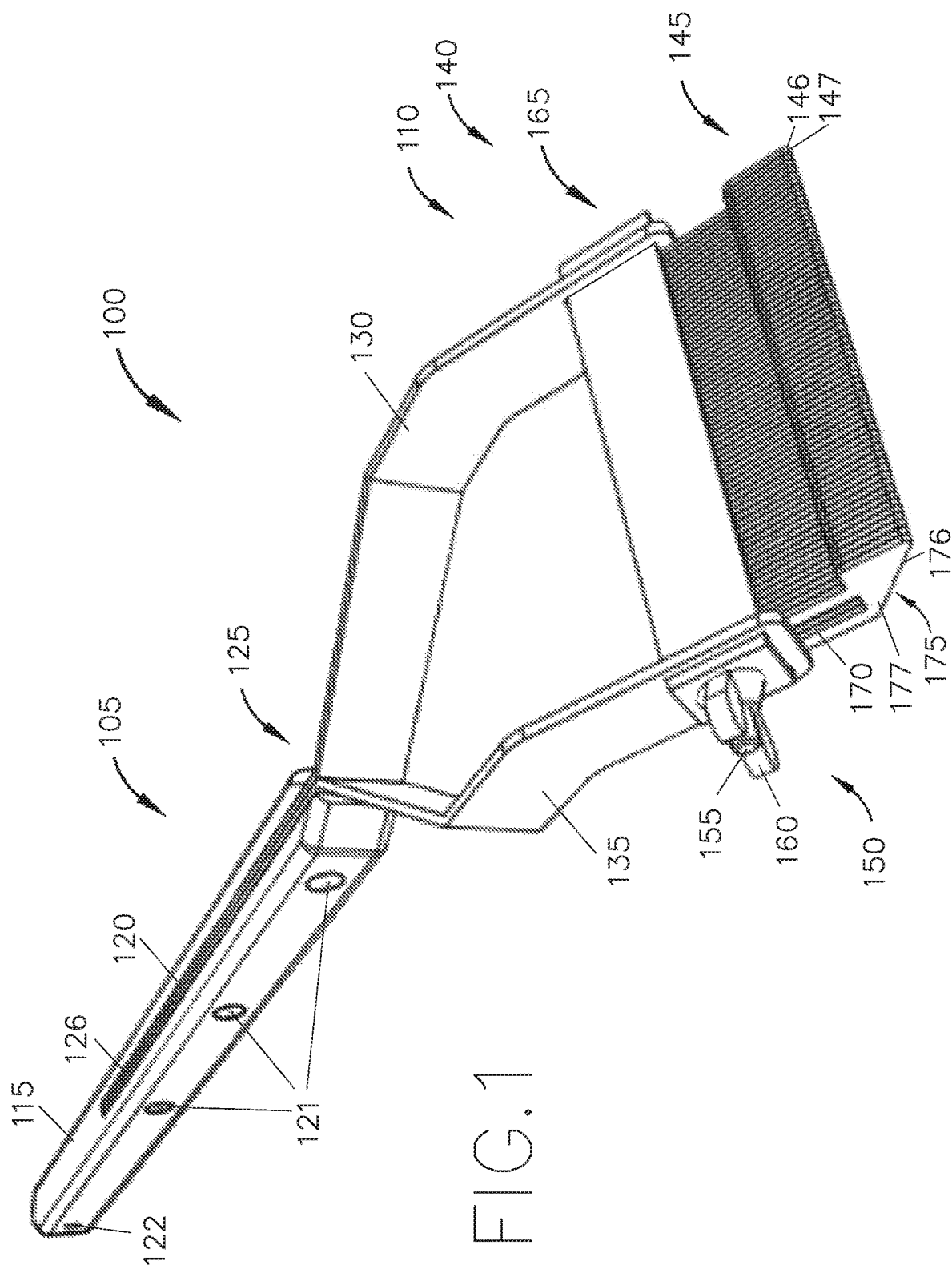
FIG. 1 is a schematic perspective view of a grill grate scraper of the invention.

FIG. 1 shows a grill grate scraper 100 according to one version of the invention. The grill grate scraper 100 is useful for cleaning food and debris from the surfaces of a grill grate, such as a grill grate on a barbecue grill. The grill grate scraper 100 includes a handle portion 105 and a scraping portion 110. The handle portion 105 comprises a handle 115 that is adapted to be grasped in the palm of a user. The handle 115 can be in any size and shape suitable for the purpose and can be made of any conventional material, such as wood, metal, or plastic. In the version of FIG. 1, the handle portion 105 includes a longitudinally extending slot 120 with one or more fasteners 121 extending therethrough to secure the scraping portion 110 to the handle portion 105. An optional hole 122, or the like, can also be provided in the handle 115 to facilitate storage of the grill grate scraper 100 by a rope extending through the hole 122 or by hanging the grill grate scraper on a peg or nail.

The scraping portion 110 of the grill grate scraper 100 includes a handle connecting portion 125 that connects the scraping portion 110 to the handle portion 105. In the version shown, the handle connecting portion 125 includes a rearwardly extending member 126 that is receivable within the longitudinal slot 120 of the handle portion 105 and is securable therewithin by the fasteners 121. Alternatively, the handle portion 105 and handle connecting portion 125 can be differently constructed and/or can be formed as a single piece of material. Intermediary to the handle portion 105 and the scraping portion 110 the grill grate scraper bifurcates into a first arm 130 and a second arm 135.

A scraper assembly 140 is located at the scraping portion 110 of the grill grate scraper 100 and can be held between the first arm 130 and the second arm 135. The scraper assembly 140 is made up of a scraper head 145, which in one version takes the form of a plurality of individual scraper blades 146 separated from one another by a gap 147, and a locking mechanism 150 that can connect the scraper assembly 140 between the first arm 130 and the second arm 135. In addition, the locking mechanism 150 can selectively lock the scraper head 145 into a plurality of scraping configurations. The locking mechanism 150 is selectively moveable from a locked position to an unlocked position. In the unlocked position, the scraper blades 146 of the scraper head 145 are moveable relative to one another, and in the locked position, the scraper blades 146 are locked against movement.

In the version of FIG. 1, the locking mechanism 150 locks the scraper blades 146 by applying a laterally compressive force. For example, in one particular version, the locking mechanism 150 comprises a screw 155 or other type of shaft or threaded shaft and a cooperating wingnut 160 or other type of nut or the like. The screw 155 extends from the first arm 130 to the second arm 135. The head of the screw 155 is positionable on an outer side of one of the arms and the wingnut 160 is positionable on the outer side of the other arm. In this way, appropriate rotation of the wingnut 160 on the threaded shaft of the screw 155 will cause the first arm 130 to move towards the second arm 135. This movement will shorten the distance between the first arm 130 and the second arm 135 and will squeeze the scraper blades 146 therebetween to the point where they are unable to move relative to one another under normal operating conditions. Rotation of the wingnut 160 in the opposite direction will separate the first arm 130 and the second arm 135 so that the compression between the scraper blades 146 is relieved so they are allowed to freely move relative to one another. A bracket 165 may optionally be provided to support the scraper blades 146 and help prevent unwanted movement, such as rotational movement relative to one another. In one version, the screw 155 has a shaft that extends through a slot 170 in each of the plurality of scraper blades 146. The slot 170 can be elongated and wider than the screw 155 so that the scraper blade 146 can move forwardly and rearwardly along the screw 155. A scraping portion 175 of each scraping blade 146 is adapted to scrape debris off of a grill grate or other surface to be cleaned. The scraping portion 175 includes a scraping edge 176 and a side surface 177 that may be flat and/or textured.

Figure 2:
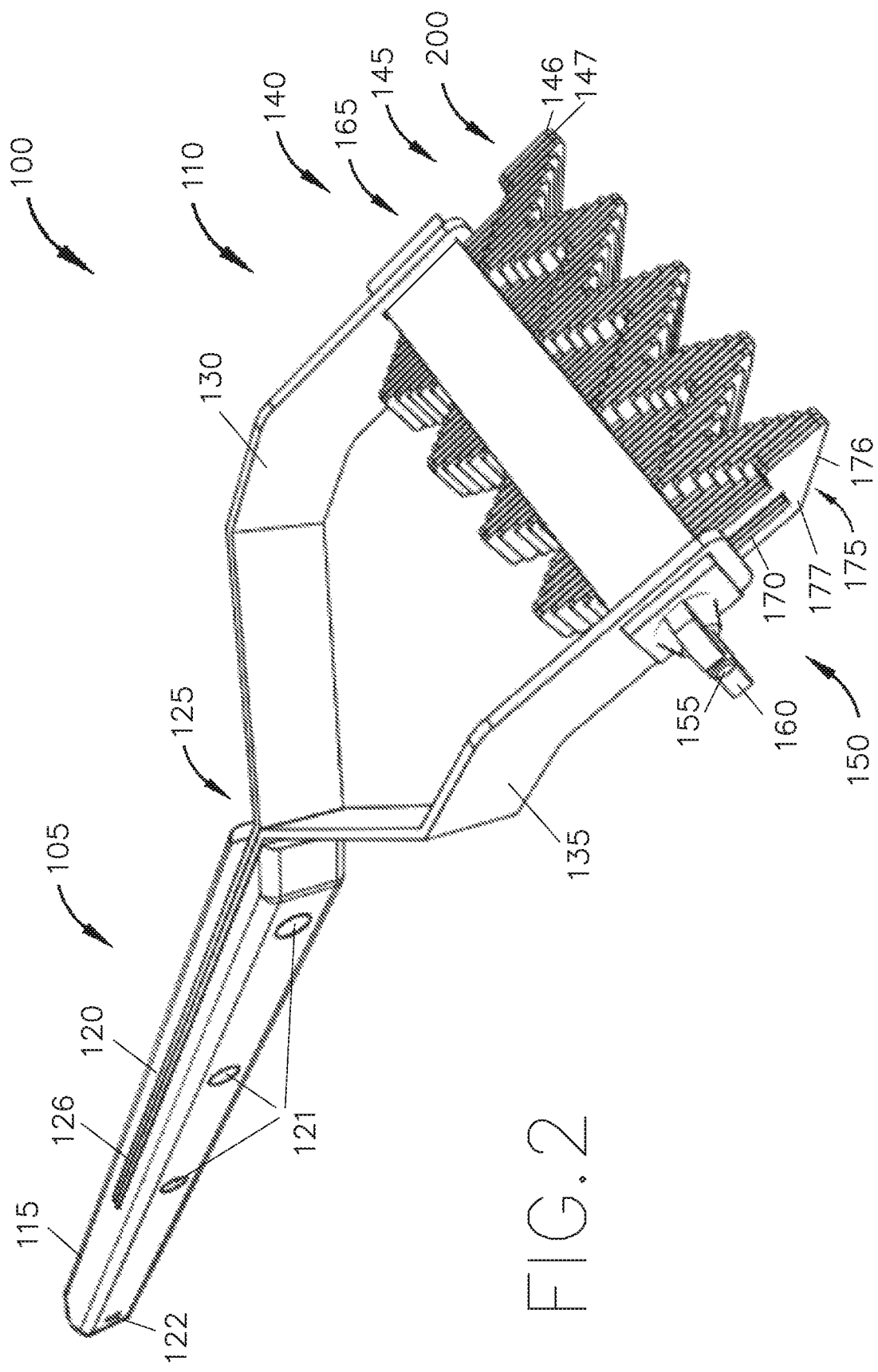
FIG. 2 is a schematic perspective view of the grill grate scraper of FIG. 1 in a grill grate configuration.

In use, the grill grate scraper 100 can begin in a position as shown in FIG. 1. The locking mechanism 150 can then be moved into an unlocked position which will allow the scraper blades 146 to slide relative to one another. The scraper blades 146 can be moved so that the scraper head 145 is in a desired shape, and then the locking mechanism 150 can be moved to a locked position so the scraper head 145 is retained in the desired shape. For example, as shown in FIG. 2, the scraper head 145 can take on a grill grate configuration 200 that is shaped to match the shape of a particular grill grate or other surface that is to be cleaned. To achieve this grill grate configuration 200, a user can simply press the scraper head 145 onto an existing grill grate while the locking mechanism 150 is unlocked so that the scraper blades 146 take on the shape of the grill grate. Gravity or other force can first extend each of the scraper blades 146 forward and then the surface of the grill grate will retract individual scraper blades 146 rearwardly until the surface of the configuration of the scraper head 145 substantially matches the contour of the grill grate. The locking mechanism 150 can then be moved to the locked position to hold the scraper head 145 in the grill grate configuration 200.

The scraper assembly 140 of the present invention is thus useful in easily and universally adjusting the configuration of the scraper head 145 to match the size and shape of any grill grate type and style. FIGS. 3A through 3C illustrate the grill grate scraper 100 contouring to different grill grate types. In FIG. 3A, angled grill grates 300 are matched by an angular scraper head configuration 310. In FIG. 3B, rectangular or flat grill grates 320 are matched by a corresponding flat scraper head configuration 330. In FIG. 3C, circular or round grill grates 340 are matched by a round scraper head configuration 350.

The locking mechanism 150 of the grill grate scraper 100, according to a version of the invention, also includes a mechanism to assure the plurality of scraper blades 146 are retained within the grill grate scraper 100 during use. As can be seen in FIG. 1 and as shown in FIGS. 4A, 4B, and 5A through 5E, the slot 170 can be an elongated slot that is closed at one or both of its longitudinal ends. In one version, both ends of the slot 170 are closed so that when the screw 155 is within the slot 170, the scraper blade 146 cannot become dislodged from the screw 155 thereby helping to prevent accidental separation of the scraper blade 146 from the grill grate scraper 100.

FIGS. 4A and 4B also illustrate additional features of a version of the grill grate scraper 100. An angled section 400 of the first arm 130 and an angled section 405 of the second arm 135 can be provided in the scraping portion 110 and the handle portion 105. The optional angled sections provide an ergonomically advantageous scraping position for the user which can improve the user's efficiency while reducing discomfort and minimizing wrist strain. The angled sections 400, 405 can be designed so that the angle between the scraping portion 110 and the handle portion 105 is from about 90 degree to about 180 degrees, or from about 120 degrees to about 160 degrees, or about 145 degrees. Alternatively, the grill grate scraper 100 can be straight and flat. The grill grate scraper 100 can also have any of various types of fasteners 121 for connecting the handle 115 to the handle connecting portion 125. In the version shown in FIGS. 4A and 4B, the fasteners 121 can comprise rivets 421 or pins or the like for permanent attachment. Alternatively, the fasteners 121 may be screws or other type of removeable fastener to allow for disassembly and/or replacement of parts. In yet another version, the fasteners can be configured to allow for changing the length of the grill grate scraper 100 and/or for changing the angle of the scraping portion 110 relative to the handle portion 105.

The scraper head 145 of the grill grate scraper 100 is designed to conveniently match the contour of multiple types of grill grates while also remaining sufficiently stable and rigid to perform the cleaning process. The scraper blades 146 can take on a variety of shapes, examples of which are shown in FIGS. 5A through 5E. Each of the scraper blades 146 has a scraping portion 175 at its forward end and a rearward portion 500 extending rearwardly from the forward end. The rearward portion 500 includes the slot 170 and/or other mechanism for engaging the locking mechanism 150. Each of the scraping portion 175 and the rearward portion 500 can have sizes and shapes designed to remove debris from the surface of an item to be cleaned. In one version, the scraping portion 175 has a scraping edge 176, which can be a substantially straight edge or other shaped edge, having a length of from about 5 mm to about 40 mm, or from about 10 mm to about 30 mm, or from about 13 mm to about 25 mm, or about 20 mm in one particular version. The scraping edge 176 can be angled relative to the arms 130,135 and/or handle 115 a desired amount. For example, the scraping edge 176 can be angled from about 20 degrees to about 180 degrees, or from about 100 degrees to about 160 degrees, or about 154 degrees in one particular version. The scraping edge 176 can be sufficiently sharpened to aid in the scraping of debris but is sufficiently dull to prevent injury if it contacts the skin. Adjacent to the scraping edge 176 is a side surface 177. The side surface 177 is sufficiently flat that it doesn't interfere with the slidability of the scraper blades 146 when unlocked. In FIG. 5A, the scraping portion 175 has a triangular shape 505. The triangular shape 505 is designed to provide greater coverage when cleaning a grill grate. The rearward portion 500 includes rearwardly extending sections 510 that may be generally parallel to one another and that extend to and meet at a rear section 515. The rearwardly extending sections 510 and the rear section define at least a portion of the slot 170.

FIG. 5B though 5E show alternative scraper blades 146 designed to extend the life of the scraper blades 146. For example, as shown in FIG. 5B, the rear section 515 can be in an inverse triangular shape 520. The inverse triangular shape 520 can be the inverse of the triangular shape 505 of the scraping portion 175. Thus, when the scraping portion 175 begins to wear, the scraper blade 146 can be flipped over so the inverse triangular shape 520 of the rear section 515 can become the scraping portion 175. Similarly, FIG. 5C shows a version of a scraper blade where the shape 525 of the scraping portion 175 is matched by the shape 530 of the rear section 515 so that the scraper blade 146 can be rotated to replace the scraping portion 175 with the rear section 515. FIG. 5D is similar to the version of FIG. 5C except that the triangular shapes are replaced by a rectangular shape 535 scraping portion 175 and a matching rectangular shape 540 rear section 515. In FIG. 5E, the scraping portion 175 has a parallelogram shape 545 and the rear section 515 has a matching parallelogram shape 550.

In addition to the shape of the scraper blades 146, the dimensions, number, and positioning of the scraper blades in the scraper head 145 can also be selected to improve the effectiveness of the grill grate scraper 100. For example, the forward end to rearward end length of each scraper blade 146 can range from about 25 mm to about 100 mm, or from about 38 mm to about 70 mm, or about 55 mm in one particular version. The thickness of the blades can range from about 0.5 mm to about 2.0 mm, or from about 0.75 mm to about 1.5 mm, or about 1.2 mm in one particular version. The slot 170 can range in length from 10 mm to about 75 mm, or from about 16 mm to about 50 mm, or about 33 mm in one particular version. The number of scraper blades 146 within a scraper head 145 can vary from 3 to 150, or from 10 to 100, or from 20 to 90, or about 50 to 80, or about 70 to 75, or 73 in one particular version. These numbers can vary further depending on thickness and design of the scraper blades 146.

The gap 147 between adjacent scraper blades 146 can also be selected to achieve certain design features. For example, the gap 147 can be selected to be sufficiently large to allow the scraper blades 146 to move freely when the locking mechanism 150 is in the unlocked position. Accordingly, in one version, the gap may be from about 0.25 mm to about 1.25 mm, or from about 0.25 to about 1.0 mm, or from about 0.25 mm to about 0.50 mm, or about 0.50 mm in one particular version. It has been determined that a gap of at least about 0.25 mm optimally provides sufficient free movement in the unlocked position. By gap it is meant the average spacing between adjacent scraper blades 146 across the scraper head 145 when the locking mechanism 150 is in the unlocked position. Alternatively, the scraper blades 146 can be contacting in a manner that force is necessary to move the scraper blades 146 when in the unlocked position.

In one version of the invention, the locking mechanism 150 operates by applying a lateral compressive force, as discussed above. When the locking mechanism 150 is in the locked position, the lateral compressive force presses adjacent scraper blades 146 against one another to prevent relative sliding therebetween. This locking mechanism 150 described above with the lateral compressive locking is advantageous for several reasons. For example, the locking mechanism 150 allows for single handed adjustment while the scraper head 145 is engaged on a grill grate. When the lateral compressive force is applied, evenly applied forces along the entire span secure the scraper blades 146 within the scraper assembly 140, maintaining the scraper blades 146 in a secure, fixed position. Lateral reinforcement increases the integrity of the desired shape of the scraper blades 146 within the scraper head 145 and more evenly secures the entirety of the scraper blades 146 within the scraper head 145. The lateral force also helps avoid slideable travel of individual scraper blades 146 within the scraper head 145 when a desired shape is achieved. In one particular version, the sides of the scraper blades 146 can include a friction increasing surface, such as a texture or ridges, that will further prevent relative sliding in the locked position. Alternatively, the locking mechanism 150 may operate in a manner other than by lateral compression.

FIG. 6 shows an exploded view of a version of the grill grate scraper 100. As can be seen, the screw 155 includes a head 605 and a threaded shaft 610. The end of the first arm 130 includes a circular opening 615, and the end of the second arm 135 includes a second opening 620. The circular openings 615, 620 are larger than the diameter of the threaded shaft 610 but smaller than the head 605. Optionally, one of the opening 615, 620 can be threaded. In one version the screw 155 and the wingnut 160 is sufficient to lock the scraper blades 146. However, in the version of FIG. 6, a bracket 165, such as a U-Shaped bracket 625 having a top portion 630 and a lower portion 635 connected by an end portion 640 is provided for added stability and to the help prevent the scraper blades 146 from rotating. The end of the first arm 130 has an upper first arm slot 645 and a lower first arm slot 650. The second arm 135 includes an upper second arm slot 655 and a lower second arm slot 660. The U-shaped bracket 625 top portion 630 is insertable into the upper second arm slot 655 and the upper first arm slot 645, and the U-shaped bracket 625 lower portion 635 is insertable into the lower second arm slot 660 and the lower first arm slot 650. A circular opening 665 in the end portion 640 U-shaped bracket 625 receives the threaded shaft 610 of the screw 155. An inner surface 670 of the top portion 630 of the U-shaped bracket 625 contacts a top surface 671 of the rearwardly extending section 510 of the scraper blades 146, and an inner surface 672 of the lower portion 635 of the U-shaped bracket 625 contacts a bottom surface 673 of a rearwardly extending section 510. This contact secures the scraper blades 146 within the bracket 165. As can be further seen, the first arm 130 and the second arm 135 can be made of two separate pieces that are joined together at the rearwardly extending member 126 and held together by the fasteners 121 extending through holes 675 in the first arm 130 and holes 680 in the second arm 135. The arms then angle away from each other at a first arm first angle 685 and a second arm first angle 686 and optionally again at a first arm second angle 690 and a second arm second angle 691 to create the space for the first arm 130 and the second arm 135 to receive the scraper assembly 140. Counter sunk holes 695 in the handle 115 can be provided for receiving fasteners 121.

Figure 7:
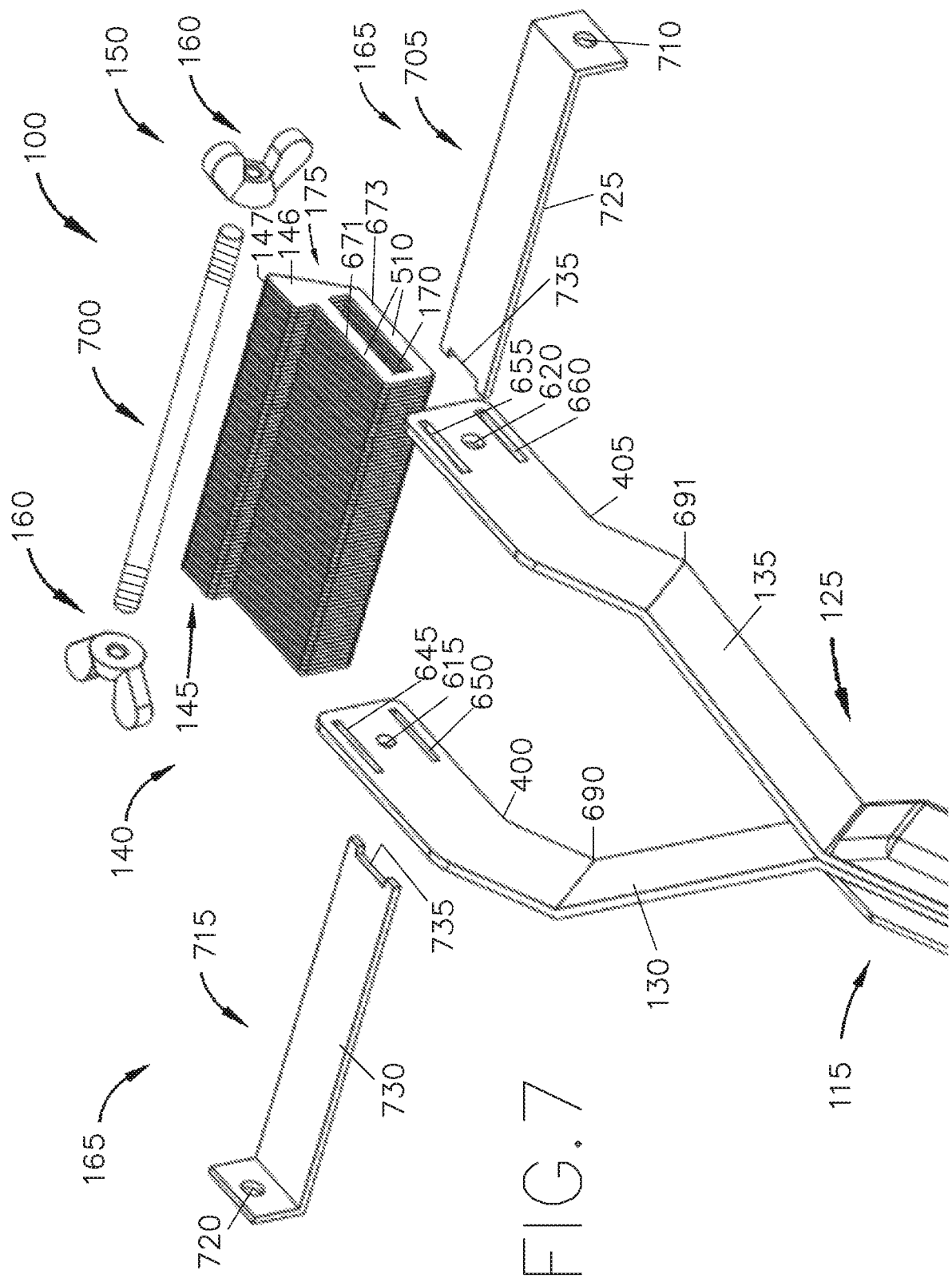
FIG. 7 is a schematic exploded view of another version of a grill grate scraper of the invention.

FIGS. 7 and 8 shows another version of a grill grate scraper 100 of the invention. In this version, the locking mechanism 150 includes a shaft 700 threaded on both end so that both ends can receive a wingnut 160. The shaft 700 extends through the slots 170 in similar fashion as the screw in the previously discussed versions. Additionally or alternatively, the bracket 165 in this version may comprise a first L-shaped bracket 705 having an opening 710 for receiving the shaft 700 and a second L-shaped bracket 715 having an opening 720 for receiving the shaft 700. Inner surfaces, such as inner surface 725 on the first L-shaped bracket 705 and inner surface 730 of the second L-shaped bracket 715 engage the top surface 671 and bottom surface 673 of the scraper blades 146 to prevent rotation of the blades, as discussed above. A notch 735 or other cutout may be provided in one or both of the L-Shaped brackets 705, 715. The notch 735 is centrally located on the end of the L-shaped brackets 705, 715 to prevent interference when a fastener is attached to the threaded shaft 700. FIG. 8 shows this version of the grill grate scraper 100 in a grill grate configuration 200.

FIGS. 9A through 9C illustrate different versions of a handle connecting portion 125 for the grill grate scraper 100. In FIG. 9A, the handle connection portion 125 is the same version as discussed above in connection with FIG. 6. FIG. 9B is a version of the FIG. 9A version but with the angles 685, 686, 690, and 691 each being right angles 905, 910, 915, 920, respectively. In FIG. 9C, the angles 685, 686, 690, 691 are replaced by smooth curves 925, 930, 935, 940, respectively.

FIG. 10A illustrates a version of the grill grate scraper 100 where the handle portion 105 and the handle connecting portion 125 are made of a single piece 1000. The single piece can be made of any suitable material, such as any of those discussed below. The shape of the single piece can be selected to match any of the shapes discussed above in connection with the other versions of the invention.

FIG. 10B illustrates a version of the grill grate scraper 100 that does not include an handle portion 105 like the ones previously discussed. Instead, in the version of FIG. 10B, an elongated hollow slot 1010 is provided. The elongated hollow slot 1010 is centrally located opposite the space for the scraper assembly 140 and is generally oval or elliptical in shape extending through the frame and of a size large enough to allow fingers of a hand to be inserted into elongated hollow slot for grasping the grill grate scraper 100. Other shapes for elongated hollow slot 1010 are possible, including but not limited to rectangles, polygons, circles and squares and shapes that have both straight and curved segments, and the like.

Suitable materials for the grill grate scraper 100 may be selected as desired. For example, for the handle 105 portion, suitable materials include but are not limited to plastic, metal, and wood products, and combinations thereof and may be of any desired length which preferably provides for maintaining a user's hand a safe distance from the surface of the barbecue grill should it be hot from use. The arms 130, 135 may be made of stainless steel or similar type of metal to reduce corrosion. However, other materials such as ABS or nylon may also be used. The bracket 165 can be made of stainless steel or similar type of metal to reduce corrosion. The U-shaped bracket 625 may be joined by welding or formed by bending. The plurality of scraper blades 146 can be made of stainless steel or similar type of metal to reduce corrosion or food safe plastic known as food contact substances (FCS) such as polypropylene, nylon or any other suitable plastic.

Method of Use

Operation and use of the grill grate scraper 100 is clear from the above description of parts. Rotation of the wing nut 160 in a counter clockwise position decompresses the sidewise pressure allowing the plurality of scraper blades 146 to each slide freely and independently in an upward or downward position. When the grill grate scrape 100 is pointed in a downward position with the wing nut loosened the scraper blades 146 gravitate to their lowest position. Holding the grill grate scraper 100 in a downward position, the scraper blades 146 are aligned over the grill grate rails and by simply pressing the grill grate scraper 100 against the grill grate rails, some of the scraper blades 146 are pushed upward due to resistance of the grill grate rails and the some of the blades fall downward extending between the grill grate rails. To ensure an accurate profile, a user may use his or her fingers to press downward on the rear of the scraper blades 146 until the entirety of the grill grate rail profile is reproduced. The thinner the scraper blades 146, the more accurately the profile of the grill grate rails will be reproduced. The wing nut 106 is then rotated in a clockwise position compressing the plurality of scraper blades 146 together sidewise applying pressure. This causes the scraper head 145 to be immoveable or fixed in a given position, thereby matching the profile of a particular grill grate rail. Gripping the elongated handle, a user can clean a hot grill without having his or her hand too close to the hot grill. The user will grip the handle of the grill grate scraper 100 and align the captured profile to the grill grate rails and apply pressure in a downward direction, thereafter the grill grate scraper 100 is pushed forward and pulled backward until the charred debris and residue is removed from the grill grate rails. The process is repeated to the entire grill grate until the grill grate rails are cleaned.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Therefore, any appended claims should not be limited to the description of the preferred versions contained herein and should include all such alterations, permutations, and equivalents as fall within the true spirit and scope of the present invention.

What is claimed is:

1. A grill grate scraper comprising:
   a handle portion adapted to be grasped by a user, and
   a scraper assembly opposite the handle portion, the scraper assembly comprising a scraper head comprising a plurality of scraper blades and a locking mechanism, wherein the locking mechanism can be in an unlocked position where the plurality of scraper blades are moveable relative to one another in a longitudinal direction and a locked position where the plurality of scraper blades are locked in place,
   wherein each of the plurality of scraper blades is a rigid blade comprising a scraping portion configured to contact a grill grate and a rearward portion, the scraping portion comprising a scraping edge and an adjacent side surface, the scraping edge comprising a substantially straight edge that extends from about 5 mm to about 40 mm and is angled relative to the longitudinal direction, and
   wherein the locking mechanism applies a lateral compressive force on the rearward portion of each of the plurality of scraper blades when in the locked position so that adjacent scraper blades press against one another to prevent relative movement in the longitudinal direction therebetween.

2. A grill grate scraper according to claim 1, wherein the rearward portion of each of the plurality of scraper blades comprises a longitudinally extended slot through which a shaft may pass.

3. A grill grate scraper according to claim 1, further comprising a handle connecting portion adapted to connect the scraper assembly to the handle portion, the handle connecting portion comprising a first arm and a second arm, wherein the first arm and the second arm diverge to create a space therebetween and wherein the scraper assembly is connected to the first arm and second arm in the space by the locking mechanism.

4. A grill grate assembly according to claim 3, wherein the locking mechanism is adapted to cause the first arm and the second arm to move towards one another in the locking position to apply the lateral a-compressive force on the scraper head.

5. A grill grate assembly according to claim 1, wherein the locking mechanism comprises a shaft that passes through an elongated slot in each of the scraper blades.

6. A grill grate assembly according to claim 5, wherein the shaft is a screw and wherein a nut is provided on at least one end of the screw.

7. A grill grate assembly according to claim 1, wherein when the locking mechanism is in the unlocked position a gap is provided between each of the plurality of scraper blades so that the scraper blades can move slide relative to one another in the longitudinal direction under the force of gravity.

8. A grill grate assembly according to claim 7, wherein the average gap between the plurality of scraper blades is at least about 0.25 mm.

9. A grill grate assembly according to claim 1, wherein the locking mechanism further comprises a bracket that prevents relative rotation between the plurality of scraper blades.

10. A grill grate scraper according to claim 1, wherein the substantially straight edge is angled from about 100 degrees to about 160 degrees relative to the longitudinal direction.

11. A grill grate scraper comprising:
a handle portion adapted to be grasped by a user, and
a scraper assembly opposite the handle portion, the scraper assembly comprising a scraper head comprising a plurality of scraper blades and a locking mechanism, wherein the locking mechanism can be in an unlocked position where the plurality of scraper blades are moveable relative to one another in a longitudinal direction and a locked position where the plurality of scraper blades are locked in place,
wherein each of the plurality of scraper blades is a rigid blade comprising a scraping portion adapted to contact a grill grate and a rearward portion, the rearward portion having a top surface, a bottom surface, and a longitudinally extending slot between the top surface and the bottom surface,
wherein the locking mechanism comprises a shaft and a bracket, the shaft extending through the slot of each of the plurality of scraper blades, and
wherein when in the locked position, the shaft of the locking mechanism applies a lateral compressive force on the rearward portion of each of the plurality of scraper blades so that adjacent scraper blades press against one another to prevent relative movement in the longitudinal direction therebetween, and the bracket of the locking mechanism contacts the top surface or the bottom surface of each of the plurality of scraper blades to prevent rotation of the scraper blades.

12. A grill grate scraper according to claim 11, wherein the locking mechanism comprises a shaft that extends laterally relative to the plurality of scraper blades, the shaft being operable to compress the plurality of scraper blades against one another in the locked position and to release the compression in the unlocked position.

13. A grill grate scraper according to claim 12, wherein the shaft comprises a screw and wherein a nut is provided on at least one end of the screw.

14. A grill grate scraper according to claim 11, wherein the bracket contacts both the top surface and the bottom surface of each of the plurality of scraper blades.

15. A grill grate scraper according to claim 11, wherein the bracket comprises a U-shaped bracket or one or more L-shaped brackets.

16. A grill grate scraper according to claim 11, further comprising a handle connecting portion adapted to connect the scraper assembly to the handle portion, the handle connecting portion comprising a first arm and a second arm, wherein the first arm and the second arm diverge to create a space therebetween and wherein the scraper assembly is connected to the first arm and second arm in the space by the locking mechanism, and wherein the locking mechanism causes the first arm and the second arm to move towards one another to cause the lateral compressive force.

17. A grill grate assembly according to claim 11, wherein when the locking mechanism is in the unlocked position a gap is provided between each of the plurality of scraper blades so that the scraper blades can move in the longitudinal direction relative to one another under the force of gravity.

18. A grill grate assembly according to claim 17, wherein the average gap between the plurality of scraper blades is at least about 0.25 mm.

19. A grill grate scraper comprising:
a handle portion adapted to be grasped by a user, and
a scraper assembly opposite the handle portion, the scraper assembly comprising a scraper head comprising a plurality of scraper blades and a locking mechanism, wherein the locking mechanism can be in an unlocked position where the plurality of scraper blades are moveable relative to one another in a longitudinal direction and a locked position where the plurality of scraper blades are locked in place,
wherein each of the plurality of scraper blades is a rigid blade comprising a scraping portion adapted to contact a grill grate and a rearward portion, the scraping portion comprising a scraping edge and the rearward portion comprising a single longitudinally extending slot,
wherein the locking mechanism comprises a single shaft that extends through the single longitudinally extending slot of each of the plurality of scraper blades and that applies a lateral compressive force on the rearward portion of each of the plurality of scraper blades when in the locked position so that adjacent scraper blades press against one another to prevent relative movement in the longitudinal direction therebetween whereby a user may operate the locking mechanism with one hand on the handle portion and with the other hand manipulating the single shaft.

20. A grill grate scraper according to claim 19, wherein the locking mechanism further comprises a bracket that contacts each of the plurality of scraper blades at a position outside the single slot in a manner that prevents relative rotation of the scraper blades.

* * * * *